Dec. 9, 1969    H. ORLICH ET AL    3,482,466
TORSION DEVICE FOR STEERING COLUMNS
Filed June 12, 1967    3 Sheets-Sheet 1
FIG. 1
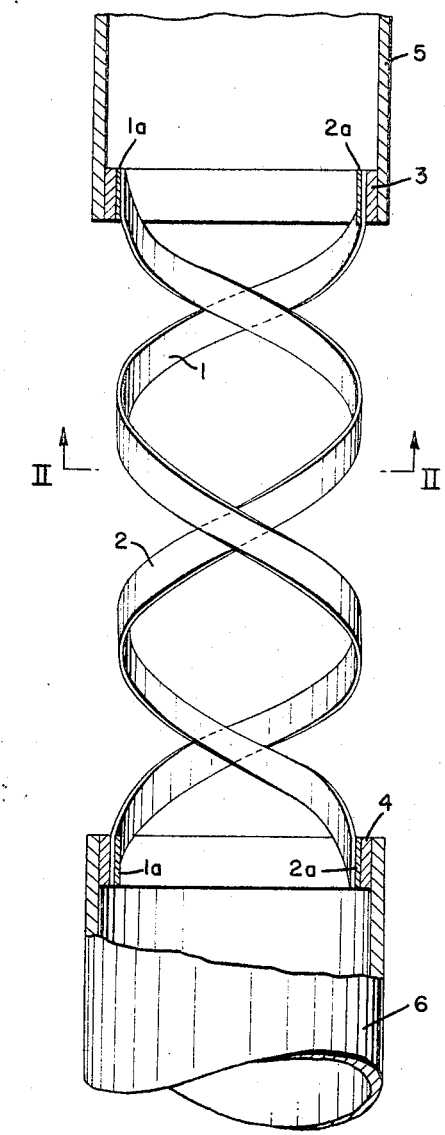
FIG. 2
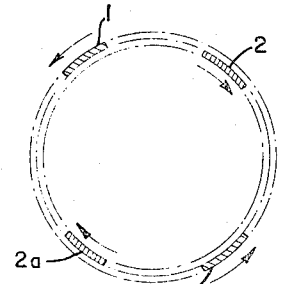
FIG. 3A    FIG. 3B
 
INVENTORS
HELMUT ORLICH,
JOSEF KALES,
ALBERT GROTEWOHL,
JÜRGEN ZASCHKE

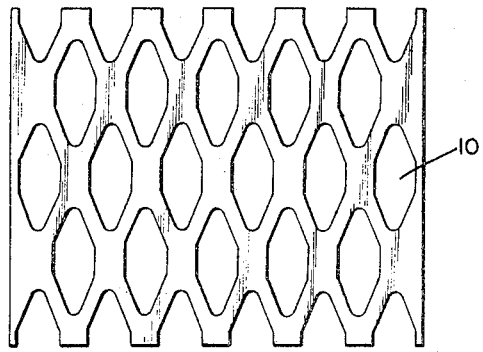
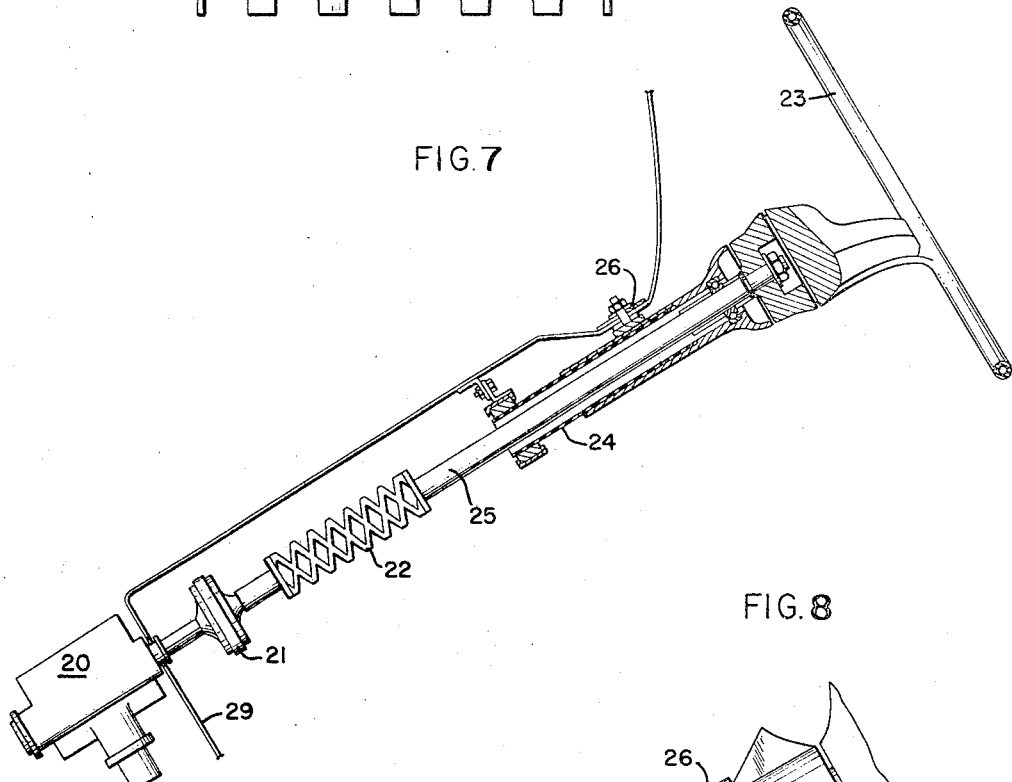
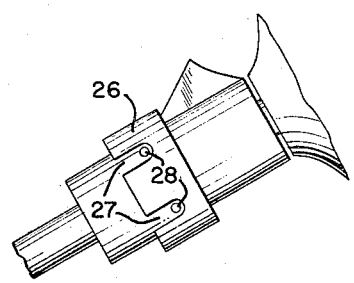

Dec. 9, 1969  H. ORLICH ET AL  3,482,466

TORSION DEVICE FOR STEERING COLUMNS

Filed June 12, 1967  3 Sheets-Sheet 3

INVENTORS
HELMUT ORLICH,
JOSEF KALES,
ALBERT GROTEWOHL,
JURGEN ZASCHKE

United States Patent Office 3,482,466
Patented Dec. 9, 1969

3,482,466
TORSION DEVICE FOR STEERING COLUMNS
Helmut Orlich, Birkenweg 29; Josef Kales, Waldpfad 15; Albert Grotewohl, Gausse-Strasse 9; and Jurgen Zaschke, Kurt-Schumacher-Ring 47, all of Wolfsburg, Germany
Filed June 12, 1967, Ser. No. 645,234
Claims priority, application Germany, Jan. 24, 1967, 1,655,581
Int. Cl. B62d 1/18
U.S. Cl. 74—492                                                    1 Claim

ABSTRACT OF THE DISCLOSURE

A collapsible safety steering column for motor vehicles having an energy absorbing element inserted directly into the steering column as a section thereof.

---

The invention relates to a collapsible safety steering column for motor vehicles.

In the case of serious motor vehicle accidents and collisions, the steering column, as a consequence of the deformation of the front part of the body and parts of the frame, may be thrust into the area where the occupant of the car is seated and may lead to series injuries to the driver.

A number of measures have already been proposed in order to decrease the danger to the driver by the steering column in an accident. One known construction, from which the present invention starts out, is based on the idea to make the steering column so resilient in an axial direction that it collapses upon itself upon a thrust-like strain. For this purpose a section of the steering column was provided with a perforated grid-like pipe with several constrictions.

It is an object of the invention to provide a constructional element for a collapsible intermediate section of a safety steering column which consists of two pairs of interlocking metallic ribbons, wound in screw-shape and with the same pitch but in the opposite direction of pitch, whereby the ribbons with the same pitch have been displaced by 180° in relation to one another. The grid-like element may consist of individual screw spirals which are telescoped and which are connected at their points of crossing, for example spot welded one to the other. The tube frame construction, however, can also be achieved by punching out a metal sheet which subsequently is rolled into a pipe and then welded.

Figure 5:
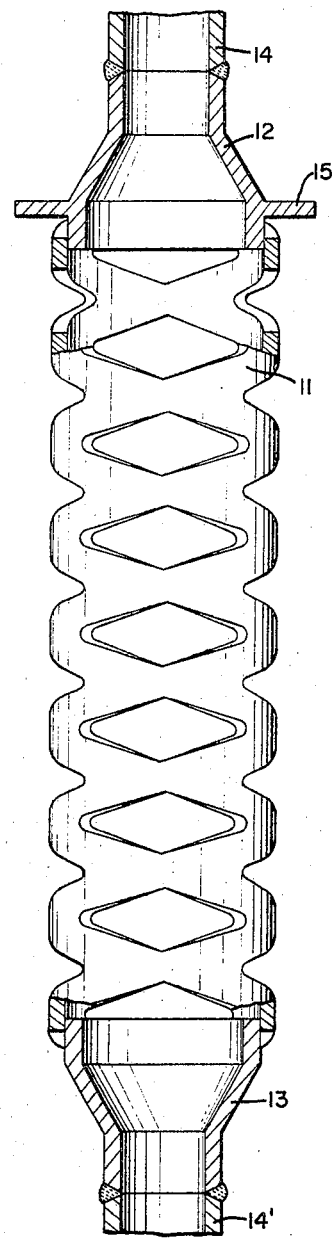
Figure 6:
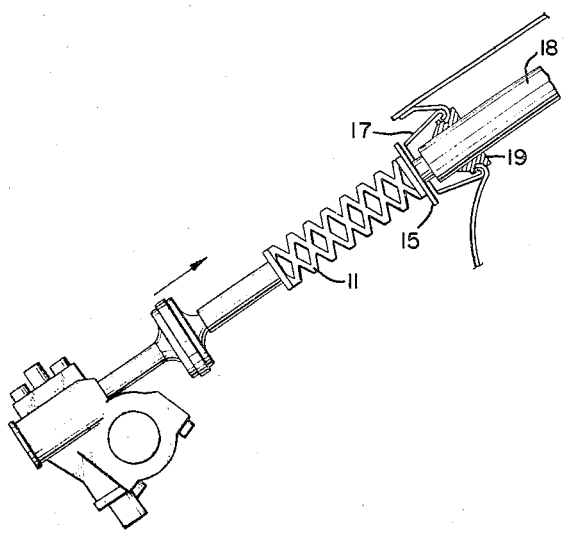

Further objects of the invention will be apparent from the following description when considered in connection with the accompanying drawings in which:

FIGURE 1 is a side elevation partly in section of a part of a safety steering column with an intermediate piece or section according to the invention, FIG. 2 is a cross section taken on line II—II in the direction of the arrows and showing four ribbons, FIGS. 3A and 3B are cross sectional views of the ribbons forming the intermediate piece, FIG. 4 is a plan view of a punched plate for the production of a tube frame according to the invention, FIG. 5 is a longitudinal section and side view showing the punched plate according to FIG. 4 welded together to form a tube, FIGS. 6 and 7 are plan views partly in section of two examples for installation of a tube frame according to the invention, and FIG. 8 is a side view of a detail of the arrangement according to FIG. 7.

In FIG. 1, the numerals 1 and 2 designate the ribbons made of steel sheet wound screw-like rising on the right and rising on the left, which are inserted into one another and which have been connected to one another at their points of crossing by means of spot welding. The constructional element contains two additional ribbons, which are wound into the corresponding ribbon 1 or 2 each time displaced by 180°. One will thus get altogether eight points of crossing of ribbons with a different direction of pitch, per pitch, whereby two points of crossing each are diametrically opposed to one another. In the side view of FIG. 1, the additional ribbons 1a and 2a, which are indicated only by their ends, coincide with the ribbons 1 and 2. Their arrangement in space can therefore only be clarified by presentation in cross section according to FIG. 2, in which the arrows indicate the direction of the pitch of the ribbons. At their upper and lower ends, the ribbons 1 and 2 have been welded to rings 3 and 4 which on their part have been connected with the ends 5 and 6 of the divided steering column. The rings 3 and 4 in the case of proper shaping can serve to bridge a possible difference in diameter between the steering column and the intermediate piece.

The ribbons, according to FIGS. 3A and 3B, may either have a simple rectangular cross section or, if necessary, they can be reinforced by means a reinforcing seam or bend.

The ribbons, in the case of a torsion and depending on the rotational direction, are under stress by traction or axial pressure. The ribbons under stress by axial pressure will try to enlarge their angular diameter, while the ribbons under strain by traction will attempt to decrease their angular diameter. A reciprocal bracing takes place at the points of crossing, as a result of which one will achieve a very high stiffness against torsion.

The tangential forces appearing at the points of crossing in the case of torsional strain of the constructional element, lie in pairs in the same transverse plane and, therefore, will produce only moments around the longitudinal axis of the elements. Thus, the steering forces will be transmitted free of transverse forces or shearing forces. The same result will be achieved in the case of three ribbons each rising on the right and rising on the left, whenever the ribbons with the same pitch are shifted by 120° in relation to one another. Generally speaking, the displacement angle in the case of $n$ ribbons in the same direction of pitch must have the value of $360°:n$, whereby in that case in each case $n$ points of crossing will be located in the same plane. In the case of a strain by axial pressure, all of the ribbons will attempt to enlarge their diameter and therefore will only put up small resistance to this strain.

FIG. 4 shows a punched plate obtained by stamping, which serves as a starting material for a tube frame according to the invention, shown in plan view. The rhomboidal segments 10 of the plate have been rounded off at their corners. One can achieve a ocnsiderable saving in material if the holes in the lattice are not completely stamped out, but if the plate is merely perforated in a slot-like manner and then spread apart according to the principle for the production of a lattice by stretching.

The plate according to FIG. 4 is rolled into a tube 11 according to FIG. 5, and the longitudinal edges are welded to one another obtusely. Intermediate pieces 12 and 13 which have been welded on serve as a connection with the actual steering column 14 and 14'. The intermediate piece 12 has a flange-like attachment ring 15, whose function will be explained on the basis of an example for assembly according to FIG. 6. In this case of assembly, a cross wall 16 of the vehicle, located relatively far back, serves to intercept the deformation energy. The attachment 15 faces a supporting ring 17 with play, which ring is supported by the cross wall 16 of the vehicle. In the cross wall 16 of the vehicle, the tube 18 of the steering column is held, in a known manner, by means of a rubber bearing 19. In the case of a frontal collision accident, the steering tube is placed under a thrust-like strain in the direction of the arrow, FIG. 6, whereby the tube frame, after the supporting ring 17 abuts against the flange 15, collapses while being deformed plastically and thus with the corresponding absorption of the deformation energy. The supporting ring 17 will keep the collision forces away from the tubular jacket 18. By means of collision experiments, it was confirmed in practice that the tube frame 11 collapses satisfactorily in a longitudinal direction.

FIG. 7 shows a second modification by way of example of such a safety steering column, where a relatively form-stable transverse wall 29 has been arranged between the steering gear 20 and the coupling 21. In this case the tube frame 22, which can be partially deformed in the first phase of a collision accident, may absorb additionally, in the course of the so-called second collision, namely the impact of the driver against the steering wheel 23, some of the deformation energy. The possibility of shifting the entire steering column 23, 24 and 25 in the direction of travel, required for this purpose, will be achieved by the mounting of the steering column by means of a bearing or support 26 with the aid of slots 27 and bolts 28, connected with the tubular jacket of the steering 24, which bolts in the normal position abut against the upper edges of the slots 27, FIG. 8.

In the case of the first energy blows occurring opposite to the direction of travel, the bearing 26 will therefore form a rigid abutment or support for the deformation of the steering columns. Upon the impact of the driver against the steering wheel 29, the steering column, on the other hand, can be pushed forward.

We claim:
1. Collapsible safety steering column for motor vehicles comprising an energy absorbing element inserted directly into the steering shaft of the steering column assembly as a part thereof and composed of metal ribons each spirally arranged and in contact and connected with one another at their points of crossing and being interlocking and wound screw like with the same pitch and with opposite direction of pitch, whereby the ribbons of the same pitch are displaced by 180 degrees in relation to one another, the individual screw spirals being telescoped into one another and are connected with one another by spot welding at their points of crossing.

References Cited

UNITED STATES PATENTS

| | | | |
|---|---|---|---|
| 2,114,663 | 4/1938 | Erickson | 74—493 |
| 3,262,332 | 7/1966 | Wight | 74—493 |
| 3,373,629 | 3/1968 | Wight et al. | 74—492 |
| 3,373,965 | 3/1965 | Bein et al. | 74—493 X |

MILTON KAUFMAN, Primary Examiner

U.S. Cl. X.R.

180—78; 188—1; 280—87